Figure 1:
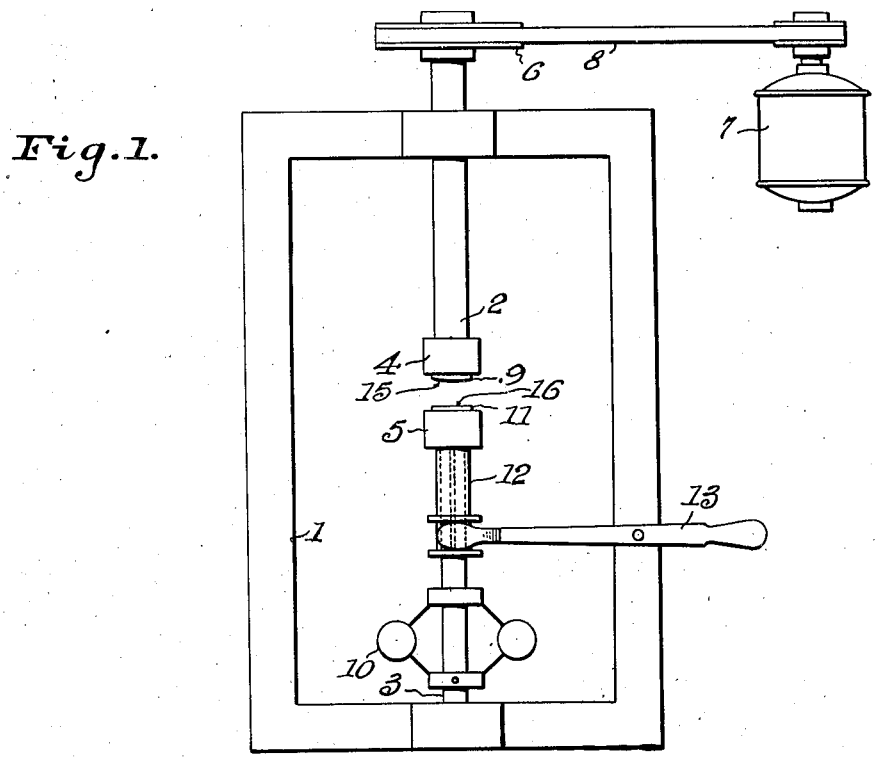

Jan. 29, 1946.        N. O. BRODERSON        2,393,883
AUTOCOLLIMATING BUTTON
Filed Feb. 5, 1944

Inventor
Neil O. Broderson
By
Attorneys

Patented Jan. 29, 1946

2,393,883

UNITED STATES PATENT OFFICE 2,393,883

AUTOCOLLIMATING BUTTON

Neil O. Broderson, Rochester, N. Y., assignor to the Government of the United States of America, as represented by the Secretary of War Application February 5, 1944, Serial No. 521,292

7 Claims. (Cl. 250—71)

This invention relates to buttons and more particularly it is directed to a method of making autocollimating buttons adapted to translate invisible light into visible light.

One of the objects of the invention is to provide a method of protecting lacquer between two welded pieces of plastic.

Another object of the invention is to provide a method of making buttons in which material to be guarded is placed between dual members rotatable in contact with each other whereby friction is set up between the members with the production of heat causing the melting of contacting portions of the members thus effecting the cementing of the dual members.

Another object of the invention is to provide a method of making autocollimating buttons in which light generating material is placed between dual lens components frictionally welded together.

Another object of the invention is to provide an autocollimating button in which dual members are welded together by frictional contact with each other and having a recess in one of the members, with phosphor or other light generating material provided in the recess and a guard closing said recess.

One of the properties which the autocollimating buttons must have is complete absorption of all light rays which would normally hit the phosphor or other light generating surface and be reflected in a diffused state directly therefrom. This property is attained by placing a direct light ray shield at the focal point of a parabolic reflector, which shield has associated therewith, or may have integral therewith, a phosphor back which faces the parabolic reflector. Hence, none but light reflected from the back is returned by the button.

In the copending application Serial No. 474,761, filed February 4, 1943, two plastic members are welded together by being mounted in chucks in opposed relation to each other, with one of the chucks being revolved at high speed, while the other chuck is maintained in a freely mounted position and capable of revolving. A surface of the plastic member mounted on the chuck revolving at high speed is brought into contact with a surface of the plastic member mounted on the other chuck whereby friction is set up between the two surfaces of the plastic members causing heat to be produced which melts the contacting plastic surfaces thus effecting the cementing of the two members together.

The present invention has been modified from the above-mentioned application for use in the manufacture of autocollimating buttons, particularly autocollimating buttons adapted to change invisible light into visible light. In such construction, light generating material is employed, which if placed at the focal point in the button becomes visible on being energized by the application of either invisible or visible light thereto. It has been found that the invention described in the copending application could suitably be applied to the manufacture of such buttons, but for the fact that the welded friction zone between the two members is in general coincidence with the point of application of the light generating material. This coincidence is understood in that violence in the friction contact of the two members tends to disperse the light generating material and in fact tends to remove it completely from the surface to which it is applied.

It is, accordingly, another object of the invention to provide an autocollimating button which may be made in two parts and may be cemented together by means of the friction method without loss of light generaitng material applied prior to the cementing of the two parts of the button.

Obviously, the invention is not limited to the guarding of light generating material in plastic buttons but is more broadly applicable to the general art of guarding materials situated between two surfaces which are to be welded together, especially by friction. Other applications of the invention will be readily understood by those familiar with the art.

Figure 2:
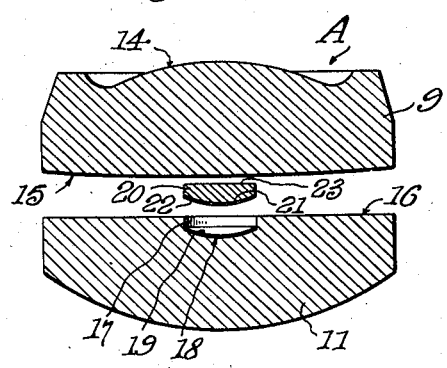
Figure 3:
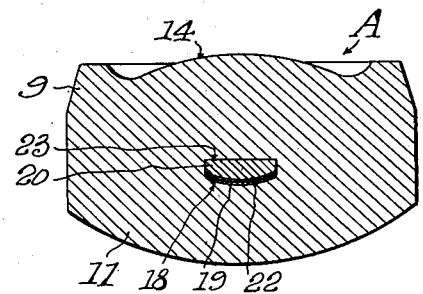

With the above and other objects and advantages in view, the invention consists of certain features of construction and operation of parts which will hereinafter be described and shown in the accompanying drawing in which:

Figure 1 is a top plan view of a machine having two chucks rotatably mounted thereon, with dual parts of the improved button to be frictionally welded together carried by the chucks;

Figure 2 is an enlarged vertical sectional view of the dual lens elements of an autocollimating button with a recess containing light generating material in one of the parts of the button and a guard for sealing the light generating material in the recess prior to welding the dual lens elements of the button together; and Figure 3 is an enlarged view of a completed button after the dual lens elements have been welded together.

Referring more specifically to the drawing, there is shown in Figure 1 a frame 1 having a driven shaft 2 and a revoluble shaft 3 mounted thereon. The driven shaft 2 has a chuck 4 mounted on its inner end and a pulley 6 mounted on its outer end, which pulley 6 is driven at a suitable constant speed for rotating the driven shaft 2 by a motor 7 through a belt 8. The chuck 4 on the inner end of shaft 2 holds a portion or lens element 9 of the improved button indicated generally by A in Figures 2 and 3, and the revoluble shaft 3 is provided with a sleeve 12 and a brake 10, here illustrated as being of the flyball governor type inertia brake, but any other suitable type of braking means may be employed. A chuck 5 is mounted on the inner end of the sleeve 12 in opposed relation to the chuck 4 on the driven shaft 2 and holds a portion or lens element 11 of the button. The sleeve 12 is slidably mounted on the revoluble shaft 3 and is actuated thereon by means of a pivoted lever 13 for moving the portion 11 of the button into and out of frictional contact with the revolving portion 9 of the button.

The button portions or lens elements 9 and 11 held in the chucks 4 and 5, respectively, are more particularly illustrated in Figure 2. The upper driven button portion 9 includes an autocollimating optical outer surface 14 and an inner surface 15 to be welded to the inner surface 16 of button portion 11. The inner surface 15 of button portion 9 is slightly convexed to compensate for differential velocity in the welding process as the outer part of the convexed surface 15 away from the center of rotation moves considerably faster than the part near the center. A recess or socket 17 is centrally formed in the flat surface 16 of the undriven bottom portion 11, with the inner surface or bottom 18 of the recess 17 being curved and covered with phosphor or other light generating material 19 and a member in the form of a plug or insert 20, preferably made of opaque plastic material, is fitted into the recess 17. The plug 20 conforms to the same shape and size as the recess 17 and is provided with a curved surface 21 provided with black lacquer 22 which is protected the same as the light generating material 19 as both are between the plug 20 and the bottom button portion or lens element 11. This black lacquer 22 on plug 20 serves as a direct light ray shield shutting off from a front view the light generating material 19.

In forming the improved autocollimating button A, Figures 2 and 3, after the light generating material 19 has been placed in the bottom 18 of the recess 17 on the bottom button member 11 and the plug 20 has been fitted into recess 17, the button member 11 is mounted on the chuck 5 and the upper button member 9 is mounted on the chuck 4 with the surfaces 15 and 16 of members 9 and 11, respectively, being in opposed relation to each other. Upon starting the motor 7, the driven shaft 2 is rotated at any suitable constant high speed through the belt 8 and pulley 6, thereby rotating chuck 4 holding the button portion 9. The lever 13 is then operated by the hand to move the sleeve 12 inwardly whereby the inner surface 16 of the non-driven button member 11 in chuck 5 is caused to engage the inner surface 15 of button member 9 thus setting up friction between surfaces 15 and 16, with the production of heat and causing the melting of the plastic material surfaces 15 and 16, thus effecting the cementing or welding of the button members 9 and 11 together.

The plug 20 prevents the light generating material 19 in the recess 17 from spreading all over the surface 16 of button portion 11 or losing all of the light generating material upon surface 15 of button portion 9 rotating at a high speed being brought into contact with surface 16 of non-rotating button portion 11. As the plug member 20 fits exactly into the recess 17, it will be held temporarily therein by friction of its surface against the surface of the button member 11 surrounding the recess. On the welding of the dual button portions or members 9 and 11 in the manner described above by the friction of the dual button portions meeting each other, the surface 15 on button member 9 will not only be welded to the surface 16 of button portion 11, but also welded to the outer flat surface 23 of plug 20 which fits into recess 17.

The autocollimating buttons contemplated by this invention are susceptible of a number of uses. For example, markers for roads or paths through mined combat areas. The particular advantage is that a phosphorescent or fluorescent light generating material may be located at the focal point of the parabolic reflecting element of the lens body and a concentrated beam of parallel rays of visible light produced either by the phosphorescent material alone or by a fluorescent material activated by invisible rays such as infra red rays projected from any direction upon the autocollimating surface of the lens body. In this manner a marking device is provided which need not be exposed to visible light to produce a concentrated beam of light and, therefore, will escape detection by occupants of aircraft and other persons not in the line of the concentrated beam.

It will thus be seen that there is herein provided a useful and efficient form of button particularly of the autocollimating type adapted to translate invisible light into visible light. Even though there has herein been shown and described certain features of construction and operation of parts, it is nevertheless to be understood that various changes may be made therein, if the changes do not depart from the spirit or scope of the claims.

Having thus described my invention, what I claim as new and wish to secure by Letters Patent is:

1. A method of making autocollimating buttons of dual members, which consists of forming a recess in one of said members, placing light generating material in said recess, sealing the light generating material in said recess and frictionally engaging said members to produce heat for melting contacting surfaces of said members and effecting a welding thereof.

2. A method of making autocollimating buttons of dual members, which consists of forming a recess in one of said members, placing light generating material in said recess, fitting a sealing member provided with a light shield in said recess over said light generating material, and securing said button members together.

3. An autocollimating button comprising dual members welded together, a socket formed in one of said members, light generating material and a black lacquered member provided in said socket.

4. An autocollimating button comprising bonded dual members, a recess formed in one of said members, light generating material provided in said recess, a plug fitted into said recess for guarding said light generating material and light shielding material provided on said plug.

5. An autocollimating button comprising dual members secured together, a recess formed in one of said members, a light generating material positioned in said recess, an opaque member mounted in said recess and light shielding material provided on said opaque member.

6. An autocollimating button comprising a pair of lens members provided with opposed contacting surfaces and bonded along said contacting surfaces, one of said lens members being provided with an outer collimating surface, the contacting surface of one of said lens members being provided with a recess, a light generating material positioned in said recess, and a sealing member positioned in said recess, said sealing member being provided with a light absorbing surface adjacent said light generating material for forming a light shield between said material and said collimating surface.

7. A method of making autocollimating buttons of dual members, which consists of forming a recess in a face of one of said members, placing a light generating material in said recess, sealing the light generating material in said recess and bonding the sealed recessed face of said member to the remaining member.

NEIL O. BRODERSON.